(12) United States Patent  (10) Patent No.: US 6,236,351 B1
Conner et al.  (45) Date of Patent: May 22, 2001

(54) METHOD AND APPARATUS FOR IMPLEMENTING AUTOMATIC TILT CONTROL OF A RADAR ANTENNA ON AN AIRCRAFT

(75) Inventors: Kevin J Conner, Kent; Daryal Kuntman, Bellevue, both of WA (US); Martin M. Morici, Timonium, MD (US); Stephen D. Hammack, Redmond, WA (US); Jim Joyce, Olthe, KS (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/348,648

(22) Filed: Jul. 6, 1999

Related U.S. Application Data (60) Provisional application No. 60/092,025, filed on Jul. 6, 1998, provisional application No. 60/111,957, filed on Dec. 11, 1998, and provisional application No. 60/118,220, filed on Feb. 1, 1999.

(51) Int. Cl.$^7$ ...................................................... G01S 13/95
(52) U.S. Cl. ................................. 342/26; 342/74; 342/75
(58) Field of Search ................................. 342/26, 73, 74, 342/75, 76, 77, 78, 79, 80, 159, 160, 161, 162

(56) References Cited

U.S. PATENT DOCUMENTS

| 3,885,237 | 5/1975 | Kirkpatrick | 343/5 W |
|---|---|---|---|
| 4,940,987 | * 7/1990 | Frederick | 342/26 |
| 5,198,819 | 3/1993 | Susnjara | 342/26 |
| 5,392,048 | 2/1995 | Michie | 342/26 |
| 5,485,156 | 1/1996 | Manseur et al. | 342/77 |
| 5,920,276 | * 7/1999 | Frederick | 342/26 |

FOREIGN PATENT DOCUMENTS

| WO 98/07047 | 2/1998 | (WO) | G01S/13/95 |

* cited by examiner

*Primary Examiner*—John B. Sotomayor (57) ABSTRACT

A method and apparatus for automatically controlling the tilt of a radar antenna to avoid ground clutter returns while scanning the weather formations of most interest. In one embodiment a terrain database is utilized to determine tilt angles for different terrain cells. The tilt angle is determined starting at the aircraft position and working out to the radar range. If a tilt angle for a more distant cell is less than for a nearer cell it is ignored taking shadowing into account. In another embodiment the weighted tilt angle frequencies are entered into a histogram and the histogram is scanned to obtain a tilt angle resulting in an acceptable amount of ground clutter.

23 Claims, 10 Drawing Sheets

*TILT ANGLE NOT ALLOWED TO INCREASE BEHIND MOUNTAINS (SHADOWING)*

STEP SIZE IS 3/4 CELL SIZE, SO WITH LARGER RESOLUTION BIGGER STEP SIZE.
IN EACH STEP A PSEUDO TILT ANGLE IS CALCULATED USING THE FORMULA.
$P_{tilt}$ = (A/C ALT − OBSTR HEIGHT) / OBSTR DIST + OBSTR DIST / 2 * EARTH RADIUS
ALL TILT ANGLES ARE WEIGHTED IN THE HISTOGRAM AS A FUNCTION OF
WEDGE AREA = k x STEP (nm$^2$)

HISTOGRAM: $mx + B = y$ (INDEX)

THE TOTAL WEIGHT OF THE ARRAY IS DETERMINED BY SUMMING ALL VALUES.
THE 90/95 PERCENTILE IS DETERMINED BY LOCATION THE INDEX WHERE THE
SUM EQUALS OR IS GREATER THAN 90/95 PERCENT OF THE TOTAL. THE BIT
VALUE IS CALCULATED USING THE FORMULA:
DEG TILT = (ATAN (PSEUDO TILT / 6078)) / $pi$ x 180

METHOD AND APPARATUS FOR IMPLEMENTING AUTOMATIC TILT CONTROL OF A RADAR ANTENNA ON AN AIRCRAFT

CROSS-REFERENCE TO RELATED APPLICATIONS

This application claims priority from provisional applications Nos. 60/092,025, filed Jul. 6, 1998; 60/111,957, filed Dec. 11, 1998; and 60/118,220, filed Feb. 1, 1999, the disclosures of which are each incorporated herein by reference.

BACKGROUND OF THE INVENTION

The present invention relates to airborne radars and more particularly to controllers for airborne radars. Radar is often sequenced through various scans, with each scan or set of scans dedicated to a particular one of the tasks performed by the radar. The scan sequence and the time allotted for each scan type limits the type and number of data gathering tasks the radar can support. In present airborne radars, the radar alternates between windshear and weather detection scans at low altitude. In one commercially available radar, one scan gathers weather data and three scans detect windshear. Even at these current rates, the amount of weather data gathering capability is marginal. Additional data gathering tasks cannot, therefore be added to the radar scan schedule of existing radars without compromising weather radar performance.

Present day airborne radar systems also require that the pilot manually control the tilt angle of the radar antenna in order to scan for the desired data usually weather. An example of manually setting tilt is described in "RDR-4B Forward Looking Windshear/Weather Avoidance Radar System Pilot's Manual with Radar Operating Guidelines," by AlliedSignal Aerospace Commercial Avionics Systems, ACS-5082, Rev 1, July '96, the entire contents of which are incorporated herein by reference.

The pilot manual describes the procedure for selecting the antenna tilt to scan for weather. This procedure requires the pilot to adjust manually the tilt of the antenna for each range scale until "a sprinkle of ground return" is visible at the far edge of the display. At the larger range scales (>80 nm) the ground returns may not be visible making an optimal antenna tilt decision difficult due to the lack of terrain returns. At these ranges, it is difficult for the pilot to make a distinction between weather returns and strong ground clutter returns without continually adjusting the antenna tilt to see if the returns disappear as the antenna beam is adjusted upward. As the altitude of the aircraft changes with respect to target height, the antenna tilt angle must be adjusted to maintain the proper positioning of the radar beam with respect to the target. This requirement increases pilot workload, and presents possible difficulties in maximizing the effectiveness and utility of the radar system. Furthermore, pilots must also make periodic adjustments to the weather radar tilt to maintain an optimal weather viewing tilt angle.

There are two different automatic tilt capabilities on general aviation radars:
 Automatic tilt based on barometric altitude and range selection.
 Automatic tilt angle compensation based on altitude changes.

In the first implementation, the radar receives the barometric altitude from the air-data computer and calculates a tilt angle to have the radar beam hit the ground at the selected display range. Since the automatic tilt angle calculation is based on the barometric altitude, not absolute altitude above the ground, this method can result in different levels of ground clutter in the display depending on the local pressure conditions as well as the factual terrain altitude. Pilot acceptance of this method of automatic tilt has been limited at best. It is definitely not suitable for air transport flight crews.

With the second implementation, the pilot is allowed to make an initial setting of the tilt angle. This eliminates problems associated with the first method. Then, if the automatic tilt control is activated, the system automatically compensates for the required tilt changes as the aircraft altitude changes. It is basically an automatic altitude change compensator. This method, however, unrealistically assumes that the terrain ahead of the aircraft is flat or otherwise unknown. This method is thus still subject to variations in the ground clutter when the aircraft flies over different terrain altitudes.

Accordingly, improvements to existing tilt control systems are needed in the industry.

SUMMARY OF THE INVENTION

The present invention describes a method for automatically determining an optimal antenna tilt angle for all weather display ranges as well as for other radar data gathering functions such as, for example, terrain, turbulence detection, autoland, and/or position validation scans. According to one embodiment of the present invention, the radar tilt control is managed as a function of flight phase and altitude. In another embodiment of the invention, a digital terrain database is used to automatically determine tilt angle. According to one aspect of the invention, the tilt management function is automated by a computer and the weather radar through the use of the aircraft's position and a terrain database.

In one embodiment of the present invention, the automatic tilt control system uses the radar range, aircraft position (latitude, longitude, altitude, and heading); radar specific parameters (radar beam width and sweep limit) and a terrain database (digital elevation model) to compute tilt angle settings for the radar. The tilt angles are automatically updated when the aircraft changes altitudes, turns or the underlying terrain requires a different tilt angle. The system will still allow the pilot to override and set a tilt angle manually.

One aspect of the invention is the use of a terrain database to compensate for terrain height variations ahead of the aircraft in different directions. When setting the tilt value via segmented tilt that allows the radar to be tilt managed over multiple segments of its sweep. In the weather radar mode, the use of segments improves the radar's ability to minimize ground clutter facilitating better storm cell detection.

One embodiment of the present invention is an automatic radar tilt system based on using the terrain altitude information in the Enhanced Ground Proximity Warning System (EGPWS). EGPWS type systems are also known by other acronyms, e.g. TAWS for terrain awareness systems, GOCAT and GCAS for ground collision avoidance system. The inventions described herein are not limited to any particular type of ground proximity warning system used in conjunction with a terrain data base and the terms "EGPWS", EGPWC" and "terrain based collision avoidance systems", or other previously listed acronyms, refer collectively to any and all such systems. In embodiments of the present invention using such systems, based on the aircraft altitude above the terrain and terrain conditions in the area, the EGPWS determines the tilt angle to intercept terrain. This information is used by the radar to determine the tilt angle settings. The automatic tilt angle settings result in minimum ground clutter on the display while maintaining the optimum weather detection capability when I the weather detection mode and permits more efficient use of the radar when in modes that require collection of terrain data.

The present invention solves several additional problems of the prior art. The present invention reduces the need for the pilot to distinguish ground returns from weather returns at all range scales. The present invention reduces the need for the pilot to adjust the antenna tilt angle to compensate for mountainous terrain in all range scales. The present invention minimizes the need for the pilot to manually adjust the tilt angle while trying to fly the aircraft and navigate around hazardous terrain and weather. Instead, the pilot can spend more time analyzing storm patterns on the weather display. Furthermore, the present invention eliminates the need to adjust tilt while on the ground by minimizing ground clutter in proximity to the aircraft.

Automating the tilt control as taught by the present invention improves the efficiency of each data gathering scan since the probability of having the radar beam appropriately targeted is greatly enhanced. This increase in the data gathering efficiency further enables the use of a single radar to perform multiple types of data gathering scans without appearing to detract from the weather updates rates to which pilots have become accustomed.

Other features and advantages of the application will be apparent in view of the following detailed description and appended drawings.

DETAILED DESCRIPTION OF THE PREFERRED EMBODIMENTS

An example of a weather radar system suitable for use with the present invention is described in U.S. Pat. No. 5,831,570, entitled "Improved Radar Resolution Using Monopulse Beam Sharpening." This application is hereby incorporated by reference for all purposes. Other radars may be used and the invention is not limited thereto.

Tilt Management Using Altitude Schedule

Figure 1:
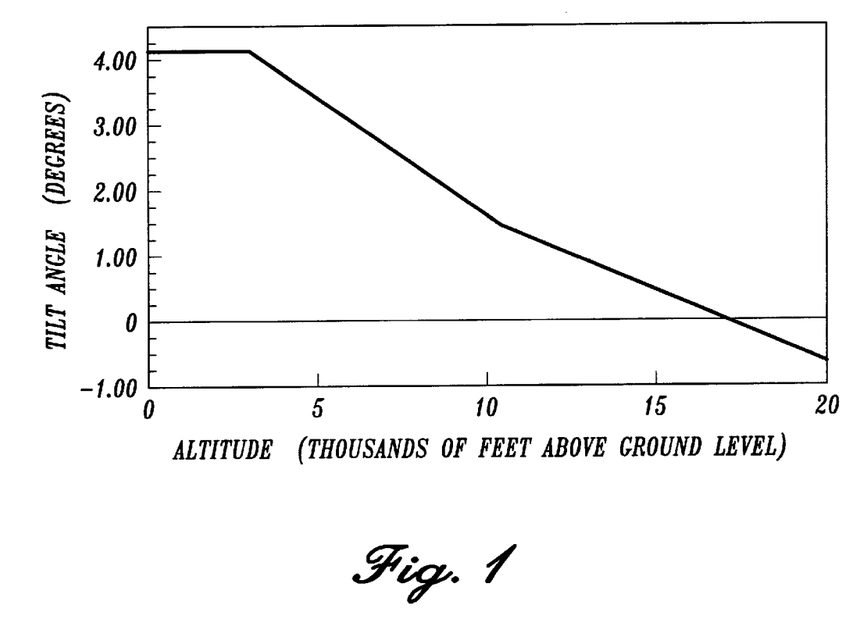
FIG. 1 shows tilt angle as a function of altitude above terrain according to the present invention.

In one possible embodiment of the invention, the radar tilt is set using actual height above ground according to a predetermined schedule to control the radar tilt angle as a function of aircraft flight phase and altitude. This presentation eliminates any manual tilt control requirements. In this embodiment of the invention, a terrain database (very low resolution) may be used as input to the radar controller. For example, the automatic tilt control may be scheduled to operate according to flight phase as depicted in FIG. 1 and as described below.

Landing, Take-off and Climb (Below 20,000 ft. AGL):

During take-off and initial climb, until 2500 ft. AGL, +4 degree tilt is sufficient to scan for weather. Between 2500 ft. AGL and 10,000 ft. AGL, reduce tilt angle 0.25 degrees for each 750 ft. of climb. Between 10,000 ft. AGL and 20,000 ft. AGL, reduce tilt by 0.25 degrees for each 1250 ft. of climb.

Landing (Below 20,000 ft. AGL):

In FIG. 1, the landing automatic tilt schedule is the opposite of the climbing procedure. Between 20,000 and 10,000 feet AGL, the tilt angle is increased by 0.25 degrees for each 1250 feet descended. Between 10,000 and 2500 feet AGL, the tilt angle is increased by 0.25 degrees for each 750 feet descended. Between 2500 feet AGL and landing, a four-degree tilt is used to scan for weather.

Cruise (Above 20,000 ft. AGL):

For ranges beyond line-of-sight, up to 320 nautical miles, the tilt angle is calculated to center the beam at 20,000 ft. AGL at the line-of-sight range. For ranges below the line-of-sight, the tilt angles are calculated to keep the beam high enough to suppress returns from ground targets with equivalent of 50 dBZ (dBZ=log 10 [reflectivity factor Z] reflectivity, at the same time centering the beam around 20,000+/−2000 ft. The minimum tilt angle is preferably not below −10 degrees. The ranges which cannot be covered with 10 degree down tilt may be covered using ground stabilization.

The tilt angle provided according to FIG. 1 to scan for weather can also be employed by systems using the weather radar for other data gathering tasks. For example, when the radar executes a terrain data gathering scan, the optimum weather data gathering tilt angle of FIG. 1 can be used ±a tilt offset angle to provide a tilt angle appropriate for scanning terrain.

Tilt Management Using a Terrain Data Base

Figure 8:
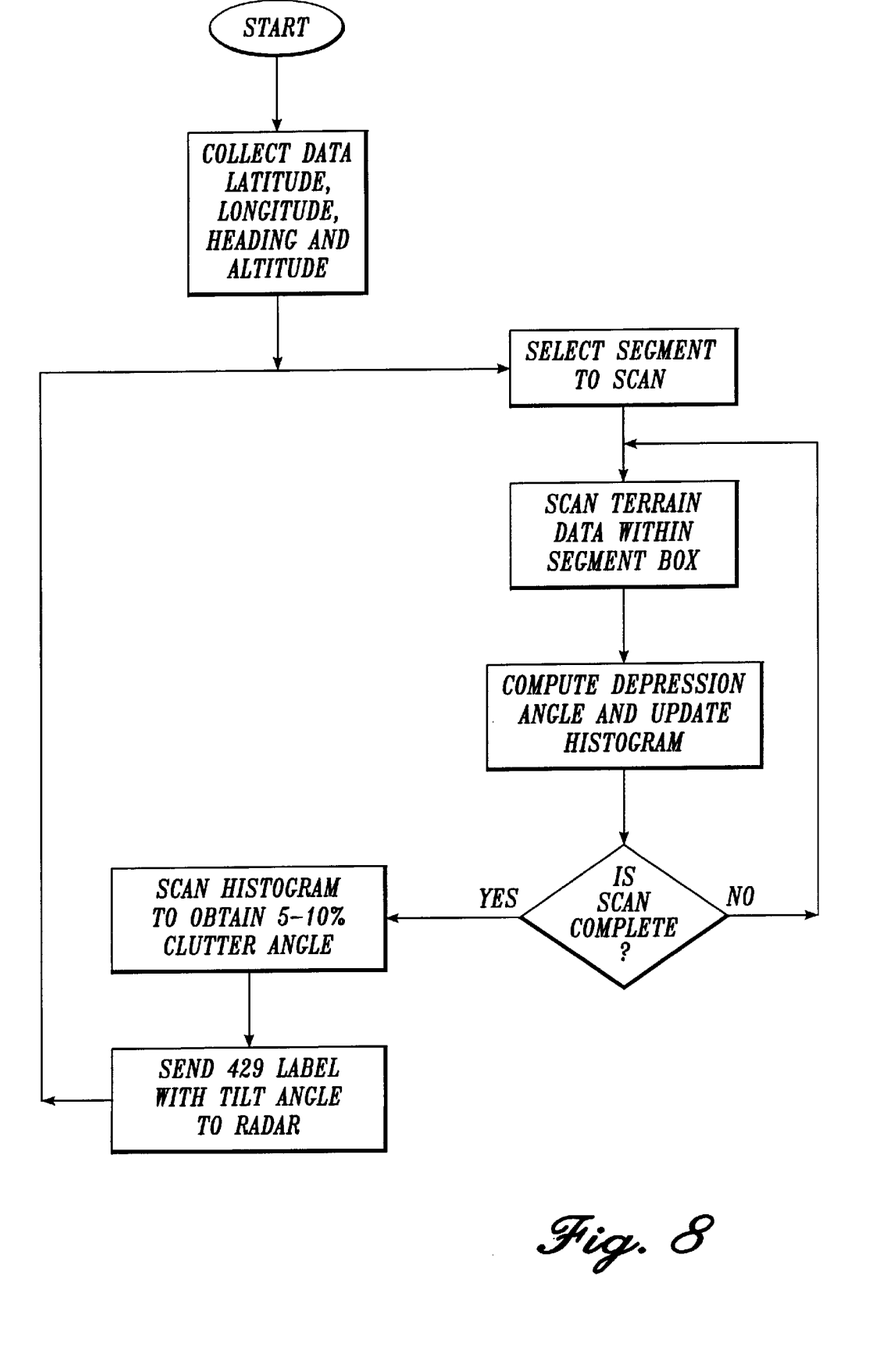
FIG. 8 is a flow chart describing automatic computation of tilt angle according to another embodiment of the present invention.

According to another embodiment of the present invention, the terrain database automatically calculates the tilt angle using an alternate technique. A terrain database suitable for use with the current invention is described in U.S. Pat. No. 5,839,080, entitled "Terrain Awareness System," which is incorporated herein by reference for all purposes. One such database is included in the Enhanced Ground Proximity Warning System (EGPWS) manufactured by AlliedSignal. Other terrain databases and/or terrain based ground proximity warning systems may be used. For ease of illustration one technique for computing tilt angles using the variables of the EGPWS system is described below and in the flow chart of FIG. 2. FIG. 8 contains a higher level, more conceptual flow chart. The invention is not so limited. In the illustrative embodiment, the invention has the following inputs:

Inputs 1. aircraft altitude, for example, relative to sea level [alt]

2. aircraft position, for example, in latitude [lat]

3. aircraft position, for example, in longitude [lng]

4. terrain database [trn (ilat, ilng)], where ilat represents the latitude index and ilng represents the longitude index 5. radar range scale in, for example, nautical miles (10, 20, 40, 80, 160, 320) [RS]

6. database cell size in, for example, nautical miles (0.25, 0.5, 1.0, 2.0, 4.0) [CS]

7. half-power elevation beam width of the weather radar, for example, in degrees (i.e., the angular distance from the main antenna axis—measured in the vertical plane containing the main antenna axis—at which the signal strength falls to half the maximum value) [elbw]

8. aircraft heading relative to north (where positive is clockwise from north) [hdg]

Figure 2:
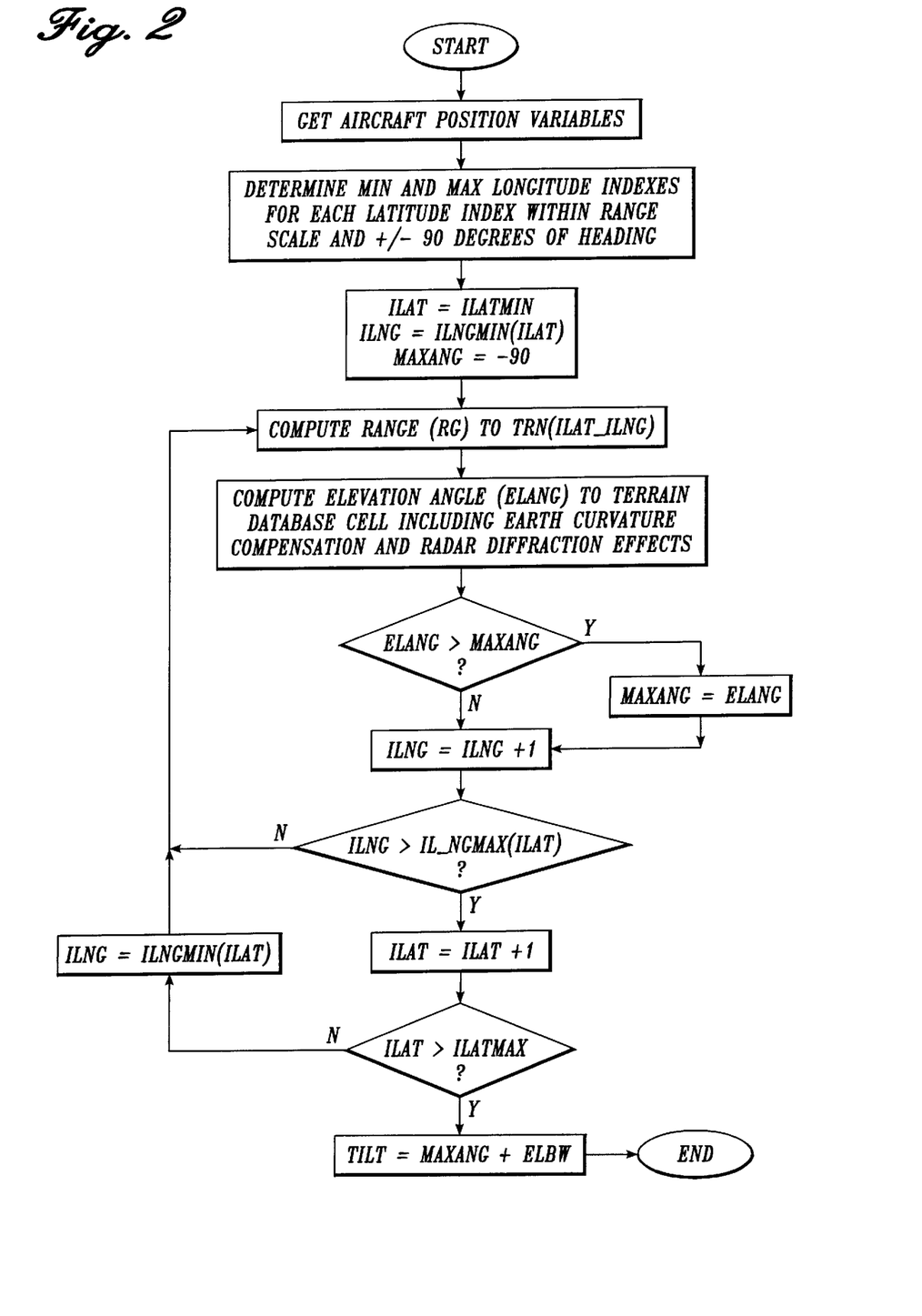
FIG. 2 is a flow chart describing automatic computation of tilt angle according to an alternate embodiment of the present invention.

The schedule of FIG. 2 first determines the values of the aircraft position variables. Then, for each latitude index within the radar range scale and within 90 degrees of the aircraft heading, the minimum and maximum longitude indices within those same limits are determined. The latitude index is then set to the minimum latitude index within the range scale and within 90 degrees of the aircraft heading and the longitude index is set to the minimum longitude index within the range scale and within 90 degrees of the aircraft heading and intersecting the latitude index. A maximum angle variable (MaxAng) is created and set to negative 90 degrees. The schedule of FIG. 2 then computes the distance between the aircraft and the terrain database point that corresponds to the latitude and longitude indices.

Compensating for earth curvature and radar diffraction according to techniques known to those of skill in the art, the elevation angle between the aircraft and the terrain database cell (ElAng) is measured and compared to the maximum angle variable.

Figure 3:
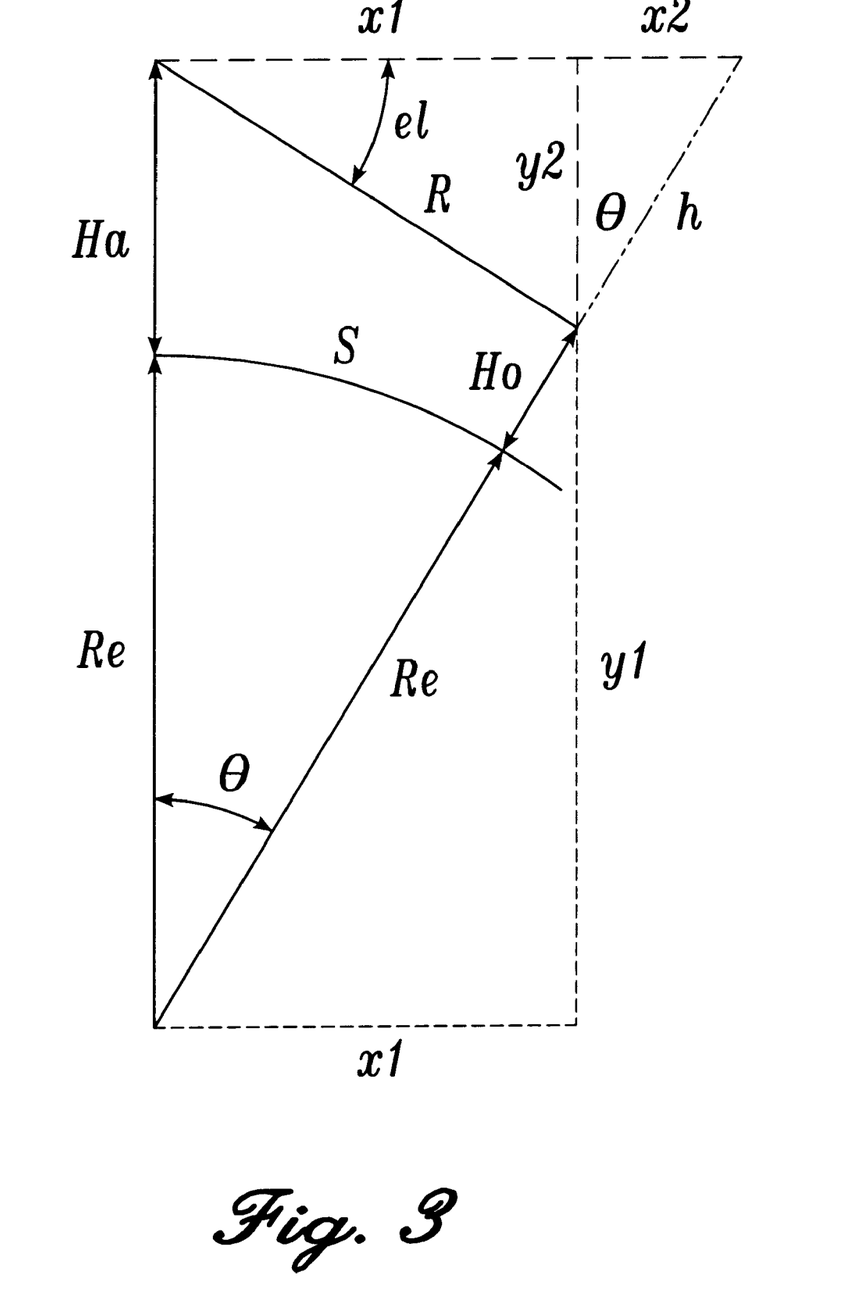
FIG. 3 is a diagram depicting co-ordinates for calculating the elevation angle.

The computation of ElAng with reference to the earth's surface is derived below, the parameters and geometry are depicted in FIG. 3.

Derivation
Re Radius of the Earth
Ha Height of Aircraft above surface at (Lat0, Lng0)
Ho Height of Obstruction above surface at (Lat1, Lng1)
R Range to Obstruction
El Tilt angle
S Surface distance to Obstruction
Surface distance $$S^2 = (Lat0 - Lat1)^2 + (cosine(Lat0)*(Lng0 - Lng1))^2$$

Theta
  $\theta = S/Re$
By inspection:

$$Cosine(\theta) = (Re + Ha)/(Re + Ho + h)$$

Solving for h:
  $h = (Re + Ha)/cosine(\theta) - (Re + Ho)$
  $x1 + x2 = (Re + Ha)*tangent(\theta)$
  $x1 = (Re + Ho)*sine(\theta)$
  $x2 = (Re + Ha)*tangent(\theta) - (Re + Ho)*sine(\theta)$
  $y1 + y2 = Re + Ha$
  $y1 = (Re + Ho)*cosine(\theta)$
  $y2 = (Re + Ha) - (Re + Ho)*cosine(\theta)$
  $tangent(El)$
    $= y2/x1$
    $= [(Re + Ha) - (Re + Ho)*cosine(\theta)]/[(Re + Ho)*sine(\theta)]$
    $= [(Re + Ha)/(Re + Ho) - cosine(\theta)]/sine(\theta)$
Approximate cosine & sine
  $Cosine(\theta) = 1 - \theta^2/2$
  $Sine(\theta) = \theta$
Then
  $tangent(El)$
    $= [(Re + Ha)/(Re + Ho) - 1 + \theta^2/2]/\theta$
    $= [(Re + Ha - (Re + Ho))/(Re + Ho) + \theta^2/2]/\theta$
    $= [(Ha - Ho)/(Re + Ho) + \theta^2/2]/\theta$
Since Re>>Ho (Ho is max 0.0001*Re), approximate Re+Ho as Re=$[(Ha - Ho)/Re + \theta^2/2]/\theta$
Substitute S/Re for $\theta$
  $= [(Ha - Ho)/Re + (S/Re)^2/2]/(S/Re)$
  $= [(Ha - Ho)/Re + S^2/(2*Re^2)]*Re/S$
  $= [Ha - Ho + S^2/(2*Re)]/S$ $$El = arc\text{-}tangent([Ha - Ho + S^2/(2*Re)]/S)$$

For small (−16<υ<+16) angles approximate arc-tangent:

$$\upsilon = \tan \upsilon = arc\text{-}tangent\, \upsilon$$

Then $$El = [Ha - Ho + S^2/(2*Re)]/S = (Ha - Ho)/S + S/2*Re$$

In the following, as depicted in FIG. 3, the elevation angle in the angle between a line projected along the flight path of the aircraft and the top of an obstruction located along the flight path of the aircraft. This angle is measured in negative degrees if the height of the obstruction is less than the height of the aircraft. For obvious reasons, this angle is sometimes referred to as the depression angle if the obstruction is below the aircraft.

Referring back to FIG. 2, if the elevation angle is greater than the maximum angle, the maximum angle is set equal to the elevation angle. If the elevation angle is not greater than the maximum angle, the longitude index is increased by one. The longitude index is then compared to the maximum longitude index within the range scale and within 90 degrees of the aircraft heading and intersecting the latitude index. If the longitude index is not greater than the maximum longitude index, then the algorithm loops back to the computation of the distance between the aircraft and the terrain database point that corresponds to the latitude and longitude indices. If the longitude index is greater than the maximum longitude index, then the latitude index is increased by one. The latitude index is then compared to the maximum latitude index within the range scale and within 90 degrees of the aircraft heading. In one possible embodiment, if the latitude index is not greater than the maximum latitude index, then longitude index is set equal to the minimum longitude index within the range scale and within 90 degrees of the aircraft heading and intersecting the latitude index and the method loops back to the computation of the distance between the aircraft and the terrain database point that corresponds to the latitude and longitude indices. In one possible embodiment, if the latitude index is greater than the maximum latitude index, then the tilt angle is calculated by adding the maximum angle to the half-power elevation beam width of the weather radar.

According to one embodiment of the present invention, the weather radar's antenna tilt angle is recomputed each time the aircraft moves outside of a database cell, changes range scale or makes a change in aircraft heading.

Tilt Management Using Statistical Processing

According to another embodiment of the invention, the tilt angle is managed over multiple segments of the radar sweep. As described more fully below, the use of multiple segments better enables the radar to manage ground clutter to improve its storm detection capability. A statistical approach is utilized to manage ground clutter for each section.

Figure 4:
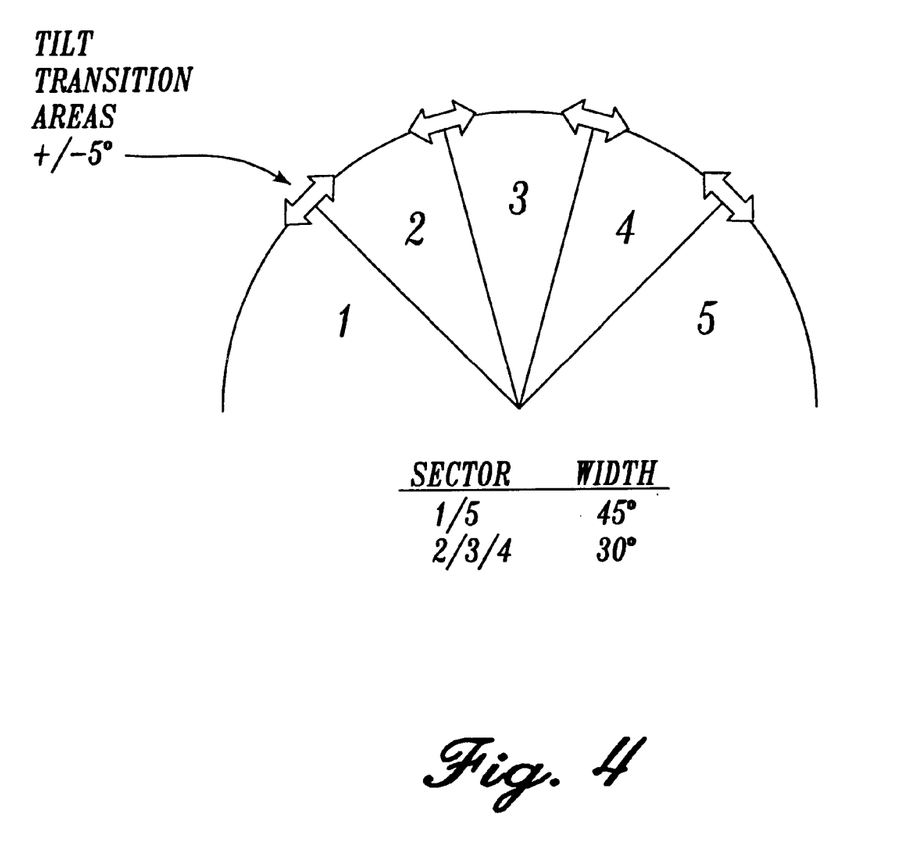
FIG. 4 is a diagram depicting the angular segmentation of a display.

FIG. 4 depicts an example of a segmented view in which the sectors nearer to the flight path are narrower to provide faster processing and more resolution.

Figure 5:
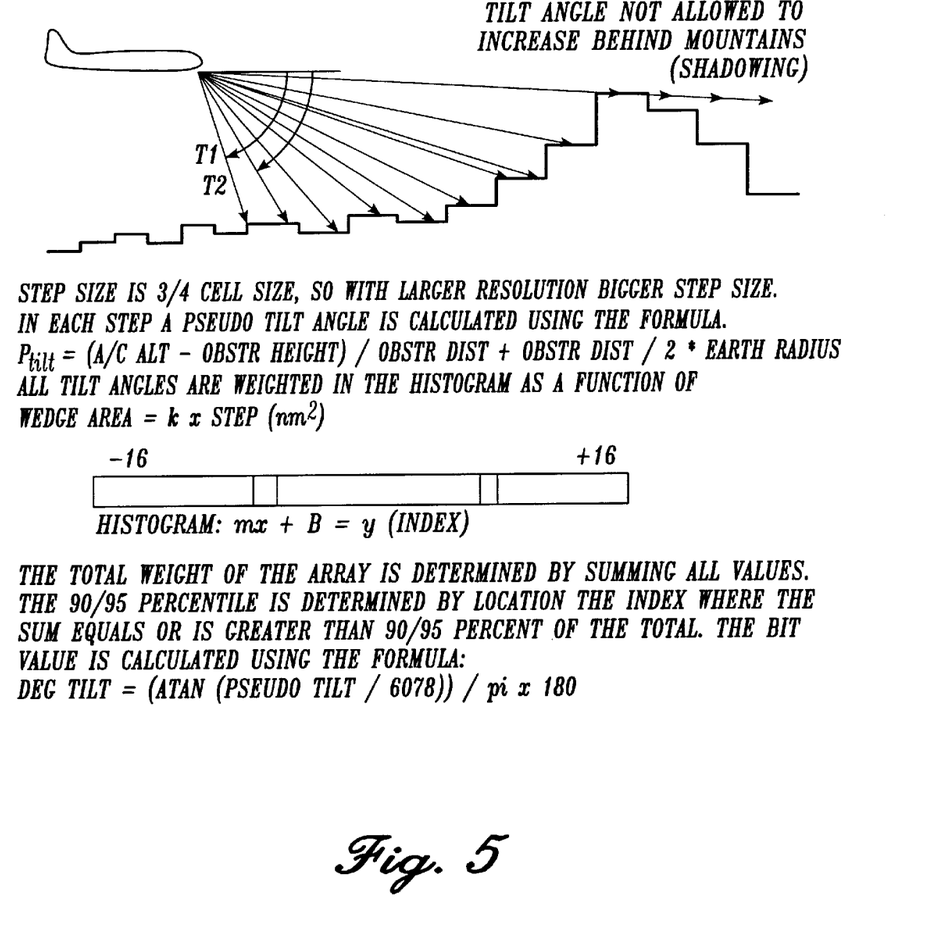
FIG. 5 is a side view depicting the scan algorithm.
Figure 6:
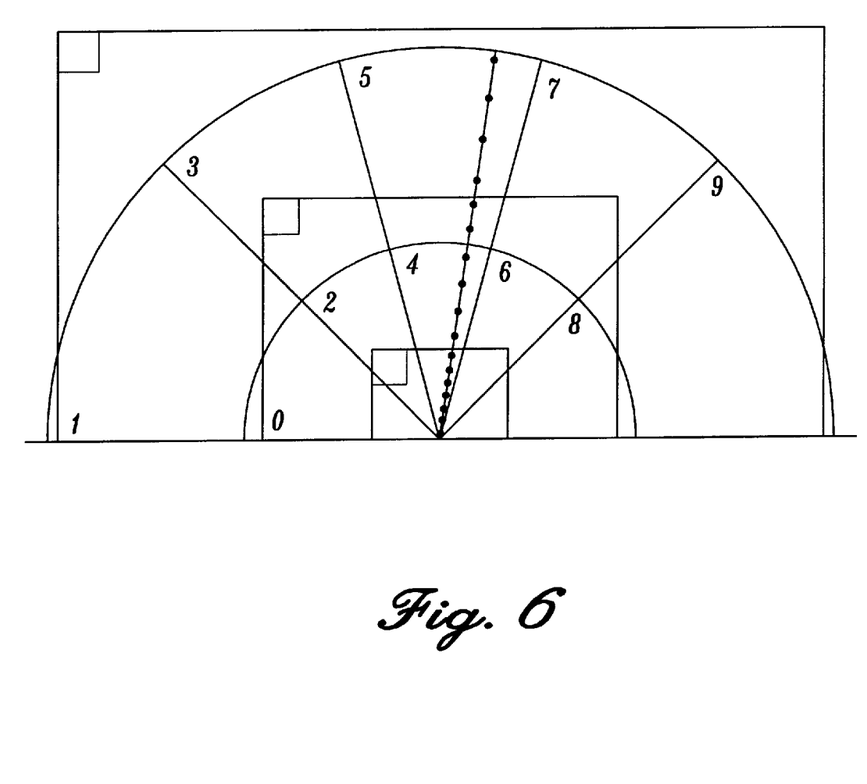
FIG. 6 is a top view depicting the scan algorithm.

FIGS. 5 and 6 provide a pictorial view of an example scanning algorithm. FIG. 5 illustrates the scanning algorithm. The aircraft begins scanning along either a longitude line (first embodiment) or an angular spoke (second embodiment) and measures the terrain height from a first cell nearest the aircraft. A first tilt angle T1 is then calculated. The terrain height from the next cell is then accessed and a new tilt angle T2 is calculated. If a new tilt angle for a cell further out is less than the tilt angle for a cell closer in the new tilt angle is ignored because the closer in cell would prevent the beam from reaching the lower elevation of the further out cell (shadowing).

In FIG. 6, per sector the algorithm calculates the elevation angle to subsequent terrain elevations, starting from the aircraft (A/C) location outward to the end of the applicable sector. The step size for each new calculation is about $\frac{3}{4}^{th}$ of a terrain cell size.

Subsequently sectors 0 (SRT), 1 (LRT), 2 (SRT), 3 (LRT) etc are scanned by breaking the sectors into angular spokes having a fixed scan spoke width. These spokes are depicted in FIG. 6. In a preferred embodiment, the scan spoke width default valve is set such that the scan spokes are 1 degree apart. The tilt values of all spokes per sector are subsequently entered in the same histogram. After each spoke the highest tilt value and step size are reset. When all spokes of an SRT sector (see below) have been entered, the SRT value is calculated using the 95 percent rule within 80 NM. The LRT value (see below) is calculated using the 90 percent rule within 160 NM.

The elevation angle is weighted as a function of wedge area and entered in a histogram. In a preferred embodiment, the histogram is limited between −16 and +16 degrees. Per scan spoke, the calculated tilt angle is not allowed to point more downward than a previous tilt angle, since the obstruction will obscure weather cells behind it. The histogram scanning algorithm is described in detail below.

Systems for Implementing Automatic Tilt Control

Figure 7A:
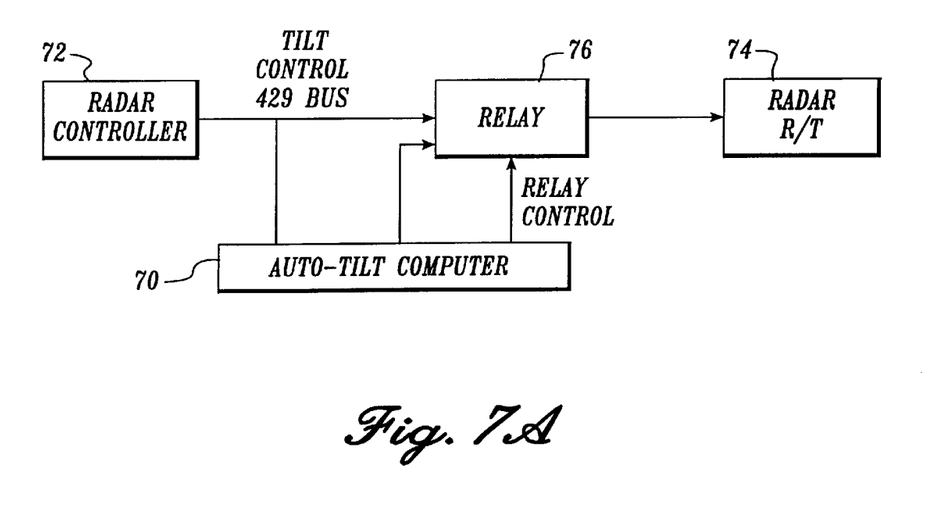
FIGS. 7A and B are block diagrams of a tilt control system.
Figure 7B:
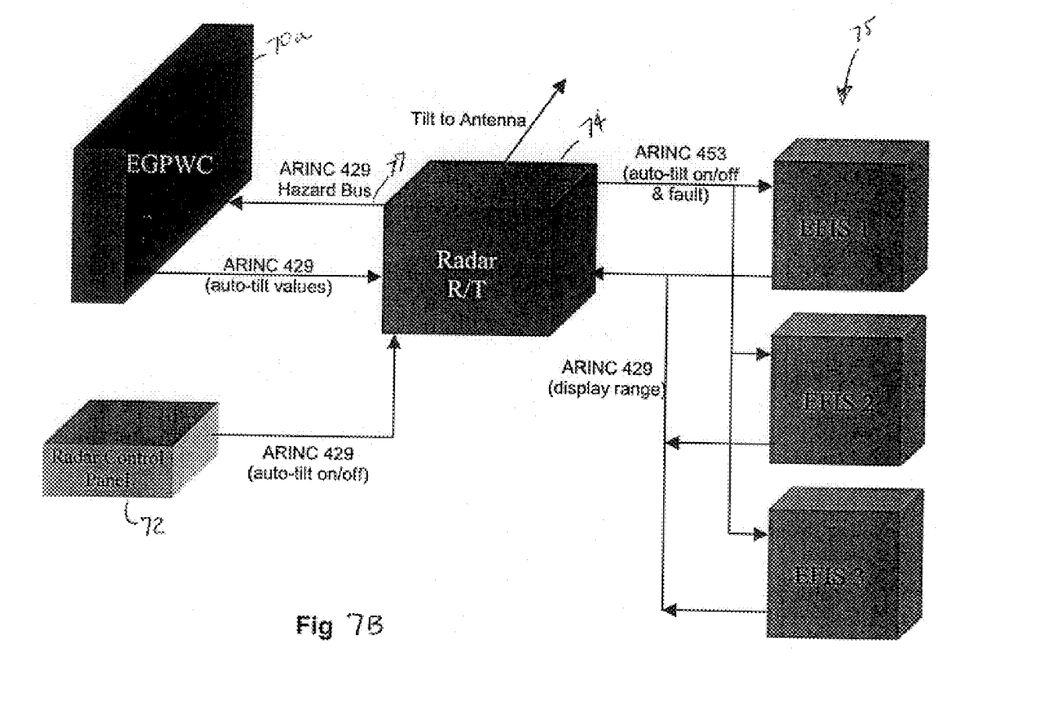

FIGS. 7A and B depict generic systems for implementing automatic tilt control. Other possible architectures will be readily apparent to those of ordinary skill in the art. In FIG. 7A, the system is composed of a tilt control computer 70, a radar control panel 72, a weather radar system 74, and a relay 76. Control panel 72 may be modified to add a switch for selecting between manual and automatic tilt. The tilt control computer 70 performs the computations for the tilt and controls flow of data to the radar 74. Control 70 may be a dedicated unit or be embedded in an existing system aboard the aircraft. In a preferred embodiment of the invention, the tilt control signals are transmitted over an ARINC 429 bus. Other data buses may be used.

The tilt control computer leaves the relay 76 de-energized until the tilt control function is activated by the control panel 72. In one embodiment, setting the radar tilt angle to −15° activates the automatic tilt control function. Optionally, the ARINC 708A bit definition can be used by control panel 72 to enable automatic tilt control by setting label 270, bits 17–22 to "0" and bit 23 to "1". Once activated, the tilt control computer 70 energizes the relay 76 and drives the radar R/T (receiver/transmitter) 74 with its own 429 bus. The 429 bus supplied by the tilt control computer 70 includes an echo of all data on the radar control panel 429 bus, with the commanded tilt angle, −15° substituted with the computed tilt angle. In the embodiment of FIG. 7B, the tilt angle calculation is performed by an EGPWS type system 70a which outputs the automatic tilt valves to R.T unit 74 then outputs tilt commands to the radar antenna. Radar control panel 72 can be used to toggle the automatic tilt function on and off. Also shown in FIG. 7B are EFIS devices 75 which may include a display. EFIS devices can be used to display information about the radar, range selection, and automatic tilt function status to the pilot. In a preferred embodiment R/T 74 and EFIS 75 are coupled via an ARINC 453 bus. The ARINC 453 bus outputs the commanded tilt valve to the display system. The activation of the automatic tilt control mode can be indicated by setting bit 16 to "1" when this embodiment is used.

One possible embodiment of the invention as described in FIGS. 7 & 8 utilizes a basic RDR-4B system, manufactured by the assignee of the present application, which includes:
- One or two RTA-4B Radar Receiver/Transmitter (R/T) units,
- A DAA-4A Antenna Drive with REA-4B 30 inch diameter Antenna,
- Displays/Controls The embodiments shown permit the installation of the automatic tilt function without the need for extensive modification of existing radar installations, or optimally as a complete integrated system.

In a preferred embodiment of the invention, the radar hazard bus 77 output is redefined to add the labels and protocol for transmitting the radar ground returns to the EGPWC.

The radar image is transmitted on the existing 429 bus to simplify installation. One label 070 and 29 label 071 words are required to transmit one spoke of radar data. Each request will generate only one frame.

Using all 512 spokes requires:

$$512 \times 30 = 15,360 \text{ words}$$

In most areas, for optimized weather detection, it is highly unlikely that one tilt angle would be appropriate for the entire area of interest. Also, different range selections may require different tilt settings. Managing the tilt angle over multiple sectors also permits the tilt logic to accommodate maneuvering flight and assists with ground stabilization of the radar sweep. Therefore, in one embodiment of the invention, the tilt control computer computes tilt angles for five sectors of the antenna sweep. For each sector the tilt control computer computes two tilt settings:

1. Short Range Tilt (SRT): A tilt angle that will have at least 95% of the ground below it within 25 mn (on-ground) or within 80 nm (nautical miles) of the aircraft.
2. Long Range Tilt (LRT): A tilt angle that will have at least 90% of the ground below it within 160 nm (on-ground or in-air) of the aircraft.

If a sector contains water, subtract 0.25 degrees from the SRT and LRT values for the sector.

The specific tilt angle for SRT and LRT are adjusted by radar R/T 74 using the following rules:

1. If the radar mode is TEST, WX or WX/TURB, the R/T 74 raises the tilt sent by the EGPWC by ½ the beamwidth (1.7 deg for 30 in and 2.0 for 24 in antenna).
2. If the radar mode is MAP, R/T 74 will lower the tilt sent by the EGPWC by ½ the beamwidth.
3. In any radar mode, the terrain sector is designated as water, decrease the auto-tilt angle by 0.25 degrees.

Radar R/T 74 changes the sector tilt in the +/−5 degree transition zone between sectors. The tilt angle in the transition zone is preferably a linear interpolation between the tilt settings for the adjacent sectors.

The tilt control computer 70 or 70a scans the terrain database within the segment and computes a elevation angle to each "cell" of terrain. These elevation angles are stored in a histogram that is weighted by the size of the cell. The tilt angle is determined by an acceptable terrain clutter percentage, nominally 5–10%. This allows the tilt angle to compensate for single peaks without having an unacceptably high tilt. In other words, when flying near a single peak, such as Mount Rainier, the calculated tilt angle will ignore that single peak as long as it does not comprise more than 10% of the viewable display. This procedure is depicted in FIG. 8.

The tilt control computer 70 or 70a preferably continuously updates these settings based on altitude and terrain changes at a rate no less than once every minute. These values are sent to the radar receiver/transmitter (R/T) unit R/T 74 over the ARINC-429 bus. The R/T 74 looks at the selected ranges (up to three), and selects the short-range tilt or long-range tilt based on the following rules:

1. For any display not showing weather, that range will be ignored, else . . .
2. If the aircraft is on the ground, minimize ground returns with 25 nm of the aircraft.
3. If all range selection are <=80 nm, then the tilt setting will use SRT.
4. If any of the range selections are >80 nm, then the tilt setting will be the LRT.
5. If the radar is operating in dual-control/tilt mode, the tilt setting will be based on the range selection for that particular scan.

Upon seeing the automatic tilt control code, the R/T 74 reads the tilt values sent by the tilt control computer, selects the appropriate values, and begins using them on the next full sweep of the antenna. As the tilt values change from sector to sector, they transition over an area starting 5° before the end of the current sector, and end 5° into the next sector. If automatic tilt control is selected but not available, R/T 74 sets the tilt to −15°.

Figure 9:
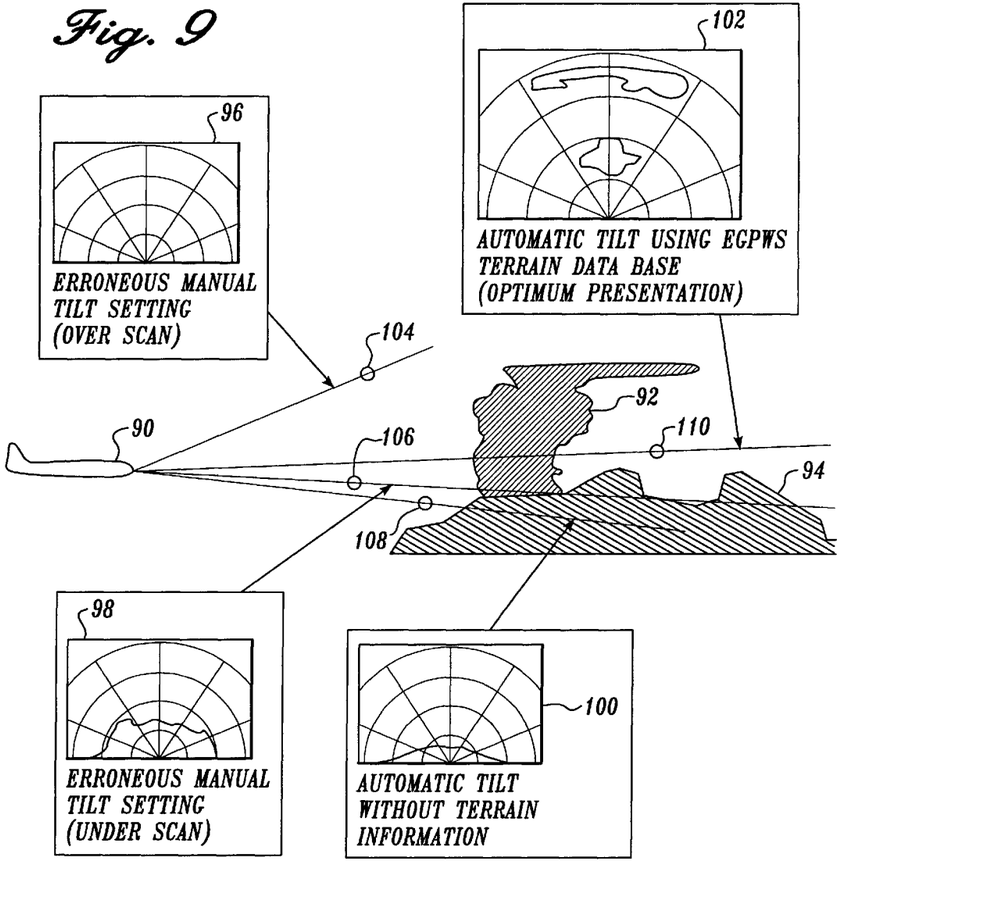
FIG. 9 is a schematic diagram depicting various scan beams and the resulting displays.

The advantages of utilizing a terrain database to control tilt angle are illustrated in FIG. 9. FIG. 9 depicts an aircraft 90, weathercell 92, and terrain 94. The screen displays 96–102 resulting from different scanning beams 104–110 are also depicted in FIG. 9. An over scan screen 96 resulting from a first beam 104 depicts an over scanning result where tilt angle is too high and the beam passes over the weather formations 92 of interest. An under scan screen 98 resulting from a second beam 106 depicts an under scanning result where the tilt angle is too low and the beam passes under most the weather formation 92 and impacts the terrain 94. Also shown is a third beam 108, tilted automatically but without terrain information. The screen 98 shows only a terrain clutter return. Finally, a fourth beam 110 is tilted based on information from a terrain database. The tilt angle is selected so that the fourth beam 110 is just above the terrain features to pass through the weather formations of interest 92.

Tilt Management Using Histograms

Figure 10:
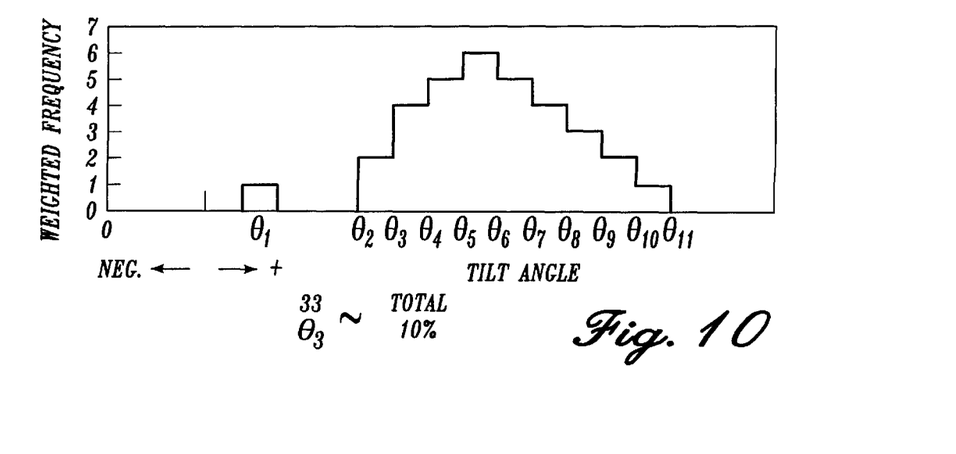
FIG. 10 is a graph depicting the frequency histogram for the calculated tilt angles.

The histogram algorithm is illustrated in FIG. 10, which provides a simplified sample for illustrative purposes. For a given tilt angle (x-axis) within a range of tilt angles, the number (frequency, y-axis) of terrain cells having a terrain height yielding the given tilt angle is plotted. In FIG. 10 is an outlier at $\theta 1$, which indicates only one cell resulting in $\theta 1$. There is no need to set the tilt angle to $\theta 1$, because one cell is only a very small part of the total scanned area.

Instead, the sum of the frequencies from all $\theta$'s is determined and set equal to the total weight. Then, a running sum is generated to find a $\theta$ such that the proportion of the running sum to the total weight is equal to the acceptable level of clutter. In FIG. 10, the total weight is 33. If the acceptable level of clutter is 10%, then the running sum is equal to 3 at $\theta 3$.

As described below, in a preferred embodiment the histogram entry is weighted by the area of the cell from which the measurement is taken. Accordingly, cells further from the aircraft have more weight since the cells have constant angular width.

The following is a detailed description of a procedure for implementing a preferred embodiment of the invention.

The terrain for each sector is scanned and a tilt angle is calculated per sector using the following steps:

A: Create a histogram (indexed array) with the format:

$$\text{int idx} = r\text{Value} * r\text{Scale} + r\text{Off}$$

Scale the minimum value of the histogram as −16 degrees.
Scale the maximum value of the histogram as +16 degrees.

B: Determine the cell size of the loaded terrain database. The tier dimensions shall be configurable (to support displays with different range choices). Note: The default nominal values shall be as shown in Table 6.7.3-2. The actual tier and cell horizontal dimensions vary dynamically based on latitude.

C: Calculate the scan step length by multiplying the cell length with the configurable [StepSize]:

$$nm\text{Step} = [\text{StepSize}] * \text{length/or width}$$

D: Determine the scan angle starting at the left angular limit of sector 0 [Sect0LtLim]. The subsequent scan angle will be [ScanSpkWdth] radians right of this angle. Calculate lat and long of the initial scan point by converting the nmStep to a LatStep and a LongStep and adding these steps to TaLatude and TaLngude into the direction of TaTruHd+Scan Angle, resulting in ScanLat and ScanLong.

E: At the lat/long location derived in step D retrieve the cell height from the loaded terrain database. If no height data is available, skip requirements of steps G through J. Calculate the wedge area as specified in step I and add it to Area Unknown Terrain within this sector. Prior to the scanning of a sector the Initial value of Area Unknown Terrain shall be set to 0.

Note: "No data" is indicated in the maps by a value of −4000 feet.

Note:

At high latitude (above 89 degrees) the scanning algorithm would 'fall off' the loaded map. In this case, the last valid terrain elevation will be used to calculate the tilt angle. This one degree circle has a diameter of 160 NM, so it would take about half an hour maximum to pass this area.

F: In case no terrain cell height can be derived from the loaded terrain map because the scanning algorithm exceeds the limits of the loaded map, then the last valid terrain elevation will be used.

G: Calculate the surface distance from the A/C to the cell using the formula:

$$S=(SQRT((Lat=(Lat0-Lat1)^2+(cosine(Lat0)*(Lng0-Lng1))^2)*60$$

Lat0=A/C latitude [degrees]
Lat1=scan point latitude [degrees]
Lng0=A/C longitude [degrees]
Lng1=scan point longitude [degrees]
S=Surface distance to cell/obstruction [NM]

H: Calculate a pseudotilt angle to the derived obstruction height using the formula:

$$Ptilt=(Ha-Ho)/S+S/2*Re$$

Ha=TACAlt, A/C Altitude [MSL]
Ho=Obstruction height, derived in 6.11.3.R80
S=Surface distance to obstruction, derived in 6.11.3.R90
Re=Radius of the earth, configurable [EarthRadWXR]
Ptilt=Pseudotilt angle I: Calculate the applicable sampled wedge area using the formula:

$$Wedge\ area=[ScanSpkWdth]_{rad}*S*Cell\ Length=weighting\ factor$$

J: Enter the calculated tilt angle from step H with the weighting factor achieved in step I into the histogram.

K: Determine the new scan point latitude and longitude by adding the LatStep and LongStep to the previous ScanLat and ScanLong.

L: Repeat requirements of steps B through J for the new scan point. If the newly calculated tilt angle points downward more than a previous tilt angle, set the new angle value equal to this previous angle value, see 5.

M: When the range limit of the applicable sector is reached [SectNRngLim] for sector N, start again one NMStep away from the A/C position, one [ScanSpkWdth] to the right of the previous scan line. Adjust the step size to the underlying terrain cell resolution.

N: Repeat requirements of steps B through M until the scan line reaches the right angular limit of sector N: [SectNRtLim].

O: Calculate the total area of the sector:

$$Sector\ N\ Total\ Area=(SectNLtLim-SectNRtLim/360)*pi*(SectNRngLim)^2.$$

P: If the total unknown area within this sector, as derived through requirement of step E when the whole sector has been scanned, Area Unknown Terrain, equals less than [AllAreaUnk]*Sector N Total Area then continue with R.

If the Area Unknown Terrain is greater than or equal to [AllAreaUnk]*Sector N Total Area then set this sector's SRT N Angle to the tilt angle calculated for the adjacent sector's SRT N+/−1 Angle and the LRT N Angle to the adjacent sector's LRT N+/−1 Angle. If two sectors are adjacent, (one left and one right) set the tilt angle to the average of the adjacent sector's tilt angles:

$$SRT\ N\ Angle=(SRT\ N-1\ Angle-SRT\ N+1\ Angle)/2.$$

Q: If all SRT sectors contain more than [AllAreaUnk] percent unknown terrain, no adjacent sector's tilt angles can be used and in that case we use the flat earth model at sea level:

For the SRT sectors a semicircle with a radius of [Sect4RngLim] is used as the total area. The tilt angle for unknown terrain, SRTU, should preferably cover an area which is [SRTPerc] percent of the total area. Thus the SRT angle hits the ground at SRTU Dist as follows:

$$Pi*[Sect4RngLim]^2/2*[SRTPerc]=Pi*(SRTU\ Dist)^2/2$$

From this the distance at which the SRT angle over unknown terrain touches MSL can be derived as:

$$SRTU\ Dist=SQRT([Sect4RngLim]^2*[SRTPerc])$$

From this distance, the SRT tilt angle for unknown terrain can be obtained from:

$$SRTU\ Tilt=Arc\text{-}Tangent((TACAlt+SRTU$$
$$Dist^2/(2*[EarthRadWXR])/SRTU\ Dist)$$

R: If all LRT sectors contain more than [AllAreaUnk] percent unknown terrain, no adjacent sector's tilt angles can be used and in that case use the flat earth model at sea level:

For the LRT sectors a semicircle with a radius of [Sect5RngLim] is used as the total area The tilt angle for unknown terrain, LRTU, covers an area which is [LRTPerc] percent of the total area. So the LRT angle hits the ground at LRTU Dist as follows:

$$Pi*[Sect5RngLim]^2/2*[LRTPerc]=Pi*(LRTU\ Dist)^2/2$$

From this derive the distance at which the LRT angle over unknown terrain touches MSL:

$$LRTU\ Dist=SQRT([Sect5RngLim]^2*[LRTPerc])$$

From this distance derive the LRT Autotilt angle for unknown terrain:

$$LRTU\ Tilt=Arc\text{-}Tangent((TACAlt+LRTU$$
$$Dist^2/(2*[EarthRadWXR])/LRTU\ Dist)$$

S: Calculate the total weight of the histogram: I[y]+= nweight.

T: In case of an SRT sector, find the index in the histogram that corresponds to the required percentile [SRTPerc] index using the formula:

From n=0 to n=index, Sum $a1_j[y]>=[\text{SRTPerc}]*n\text{weight}$

U: In case of an LRT sector, find the index in the histogram that corresponds to the required percentile [LRTPerc] index using the formula:

From n=0 to n=index, Sum $a1_j[y]>=[\text{LRTPerc}]*n\text{weight}$

V: From the histogram retrieve the Pseudotilt angle that corresponds with the index found in step T for SRT: Ptilt SRT and R230 for LRT: Ptilt LRT.

W: Calculate the overall sector angle by using the formula:

SRT N Angle=(ARCTAN(Ptilt SRT/6078))/pi*180

LRT N Angle=(ARCTAN(Ptilt LRT/6078))/pi*180

X: Transmit the ARINC 429 label that transmits the SRT and LRT angle derived in requirement 6.11.3.R250 on the ARINC 429 outputbus.

Y: After calculating and transmitting SRT and LRT N Angles calculate SRT and LRT N+1 Angles. After calculating and transmitting SRT8 Angle and LRT 9 angle calculate and transmit SRT 0 Angle and LRT 1 Angle.

The invention has now been described with reference to the preferred embodiments. Alternatives and substitutions will now be apparent to persons of ordinary skill in the art. In particular, the invention is not limited to the particular radar systems or terrain database described above. Any radar system with controls for tilting the radar antenna can make use of the present invention. Further, the particular statistical algorithm for compensating ground clutter is not critical to practicing the invention. Other statistical techniques could be utilized. Further, automatic tilt control as taught by the application may be used to control tilt in other than radar scanning applications, for example, in correlating or verifying a terrain database. Accordingly, it is not intended to limit the invention except as provided by the appended claims

APPENDIX

In a preferred embodiment of the invention utilizing an AlliedSignal RDR-4B radar, and ARINC 429 databus, the following labels and protocols may be used to transmit tilt angle data. FIGS. 4 and 6 depict sectors and scan algorithm plan views respectively.

Tilt Label Definitions

The following labels are used to transmit the appropriate tilt angle setting for each sector. All labels are transmitted continuously at 1 Hz.

| LABEL | SECTORS |
|---|---|
| 060 | TDCT for All Sectors |
| 061 | 1 |
| 062 | 2 |

Tilt Angle Bit Definitions

Label 060 Definition—Terrain Data Correlation Tilt

For label 060, the definition and weighting of the tilt is defined as follows:

| BITS | DEFINITION | COMMENTS | | | |
|---|---|---|---|---|---|
| 1–8 | Label (Octal) | 060 | | | |
| 9–10 | SDI | N/A, set to 0s | | | |
| 11–17 | TILT ANGLE (Terrain Data Correlation Tilt) | Per ARINC 708A definition, Bit 11 LSB | | | |
| 18–24 | Frame Number | *See description below | | | |
| 19 | Terrain Selected - Left | **See description below | | | |
| 20 | Terrain Selected - Right | **See description below | | | |
| 30–31 | SSM | BIT | 31 | 30 | |
| | | | 0 | 0 | FW |
| | | | 0 | 1 | NCD |
| | | | 1 | 0 | TEST |
| | | | 1 | 1 | NORM |
| 32 | PARITY | Set to ODD | | | |

* Frame number is used to trigger a new Terrain Data Correlation Acquisition. The radar system schedules the frame capture and transmit via hazard bus 429 back to the EGPWC, as the radar's schedule allows. The next frame capture will be requested by the EGPWC when the Frame Number advances.
** These bits indicate if terrain is selected for display. If terrain is selected (implying weather is not) then this range will not be used in determining the proper SRT or LRT value.

Label 061–065—Autotilt Sector Tilt Definitions

For each label (061 to 065) the definition and weighting of the tilt is defined as:

| BITS | DESCRIPTION | COMMENTS | | | |
|---|---|---|---|---|---|
| 1–8 | Label | 061/062/063/064/065 | | | |
| 9–10 | SDI | N/A, set to 0s | | | |
| 11–17 | TILT ANGLE (Short Range Tilt) | Per ARINC 708A definition, Bit 11 LSB | | | |
| 18–24 | TILT ANGLE (Long Range Tilt) | Per ARINC 708A definition, Bit 18 LSB | | | |
| 30–31 | SSM | BIT | 31 | 30 | |
| | | | 0 | 0 | FW |
| | | | 0 | 1 | NCD |
| | | | 1 | 0 | TEST |
| | | | 1 | 1 | NORM |

What is claimed is:

1. A method, performed on an aircraft, for automatically adjusting the tilt angle of a radar antenna to limit ground clutter to acceptable levels, with the radar antenna scanning a forward field of view within a specified range, said method comprising the steps of:

storing a terrain database including terrain cells identified by latitude and longitude intersections indexed by ilat and ilng values, with each terrain cell including a terrain elevation value;

determining current location co-ordinate indices of the aircraft;

for co-ordinates within the field of view and range, and based on the current location co-ordinate indices, determine minimum and maximum latitude and longitude index values;

setting ilat equal to the minimum latitude index and setting ilng equal to the minimum longitude index;

(a) retrieving the terrain elevation at the co-ordinates specified by ilat and ilng from the terrain database;

(b) based on the terrain elevation and distance between the current location co-ordinates and the point (ilat, ilng) calculating an elevation angle between a horizontal along the flight path of the aircraft and the terrain elevation point;

(c) storing the calculated elevation angle;

if ilng is less than the maximum longitude co-ordinate incrementing ilng else;

if ilng is equal to the maximum longitude co-ordinate and ilat is less than the maximum latitude co-ordinate incrementing ilat and repeating steps (a), (b), and (c) else;

adjusting the antenna to have a tilt angle equal to the elevation angle.

2. A method, performed on an aircraft, for automatically adjusting the tilt angle of a radar antenna to limit ground clutter to acceptable percentage level, with the radar antenna scanning a forward field of view within a specified range, said method comprising the steps of:

storing a terrain database including terrain cells located at latitude and longitude intersections indexed by co-ordinate index values, with each terrain cell including a terrain elevation value;

determining current location co-ordinate indices of the aircraft;

breaking the field of view into segments of constant angular width;

for each segment, breaking the segment into spokes of constant angular width;

for co-ordinates within the spoke and range, and based on the current location co-ordinate indices, set cell co-ordinate index values to minimum co-ordinate index values;

(a) obtain terrain cell height from a terrain cell located at the cell co-ordinate index values;

(b) based on the terrain elevation and distance between the current location co-ordinates and cell co-ordinates calculating a calculated tilt angle between a horizontal along the flight path of the aircraft and the terrain cell;

(c) increase a frequency count of an index, with the index equal to the calculated tilt angle, in a histogram storing frequencies at indexes of tilt angles over a predetermined range;

(d) calculating new cell co-ordinates of a next cell stepped radially along the spoke and repeat steps (a), (b), and (c) out to a terrain cell at the specified range;

(e) scanning the histogram to determine a maximum tilt angle resulting in an acceptable percentage of ground clutter.

3. The method of claim 2 where said step of scanning further comprises the steps of:

weighting a frequency entry the area of a cell from which the tilt angle is measure;

summing all frequency values in the histogram to obtain a total weight;

sum frequencies for increasing elevation angles to obtain a running sum;

determining the maximum tilt angle where the running sum has a value equal to the acceptable percentage level of the total weight.

4. The method of claim 2 further comprising the steps of:

calculating a maximum tilt angle for a first sector of the display;

clearing the histogram prior to breaking up a second sector into angular spokes;

for angular spokes in the second sector, repeating steps (a)–(e).

5. The method of claim 2 where said step (b) of calculating a calculated tilt angle further comprises the step of:

setting the calculated tilt angle equal to an immediate previous calculated tilt angle if the calculated tilt angle points more downward than the immediate previous calculated tilt angle to take into account that nearer high terrain points shadow further low terrain points.

6. The method of claim 2 where said step (d) of calculating new co-ordinates further comprises the steps of:

selecting either a long range or short range, with the magnitude of the short range being less than the magnitude of the long range and with the magnitude of both the long and short range being less than or equal to the specified range;

for the selected range, terminating calculating calculated co-ordinates when a cell located at the calculated co-ordinates is outside a selected range.

7. A system, located on an aircraft, for adjusting the tilt angle of a weather radar antenna located on the aircraft, said system comprising:

a terrain awareness system storing a terrain database including terrain cells at latitude and longitude intersections indexed by co-ordinate index values, with each terrain cell including a terrain elevation value;

an antenna tilt control mechanism for controlling the tilt of the antenna;

a tilt control computer, including storage for storing program code and data;

a bus system coupling the tilt control computer, antenna tilt control mechanism, and tilt control computer;

with the tilt control computer executing program code to:

determine current location co-ordinate indices of the aircraft;

for co-ordinates within the field of view and range, and based on the current location co-ordinate indices, determine minimum and maximum latitude and longitude index values;

set ilat equal to the minimum latitude index and set ilng equal to the minimum longitude index;

(a) retrieve the terrain elevation at the co-ordinates specified by ilat and ilng from the terrain database;

(b) based on the terrain elevation and distance between the current location co-ordinates and the point (ilat, ilng) calculate an elevation angle between a horizontal along the flight path of the aircraft and the terrain elevation point;

(c) store the calculated elevation angle;

if ilng is less than the maximum longitude co-ordinate increment ilng else;

if ilng is equal to the maximum longitude co-ordinate and ilat is less than the maximum latitude co-ordinate increment ilat and repeat steps (a), (b), and (c) else;

adjust the antenna to have a tilt angle equal to the elevation angle.

8. A method, performed on an aircraft, for automatically adjusting the tilt angle of a radar antenna to limit ground clutter to acceptable percentage level, with the radar antenna scanning a forward field of view within a specified range, said method comprising the steps of:

storing a terrain database including terrain cells located at latitude and longitude intersections indexed by co-ordinate index values, with each terrain cell including a terrain elevation value;

determining current location co-ordinate indices of the aircraft;

scanning the field of view and range, based on the current location, to determine frequencies of calculated tilt angles;

based on the frequencies and acceptable amount of clutter, determine a control tilt angle.

9. A method, performed on an aircraft, for automatically adjusting the tilt angle of a radar antenna to limit ground clutter to acceptable levels, with the radar antenna scanning a forward field of view within a specified range, said method comprising the steps of:

storing a terrain database including terrain cells identified by latitude and longitude intersections indexed by ilat and ilng values, with each terrain cell storing including a terrain elevation value;

determining current location co-ordinate indices of the aircraft;

for co-ordinates within the field of view and range, and based on the current location co-ordinate indices, determine minimum and maximum first and second co-ordinate index values;

setting the first co-ordinate index equal to the minimum first co-ordinate index and setting the second co-ordinate index equal to the minimum second co-ordinate index;

(a) retrieving the terrain elevation at the co-ordinates specified by first and second co-ordinate indices from the terrain database;

(b) based on the terrain elevation and distance between the current location co-ordinates and the point specified by the co-ordinate indices calculating an elevation angle between a horizontal along the flight path of the aircraft and the terrain elevation point;

(c) storing the calculated elevation angle;

if ilng is less than the maximum longitude co-ordinate incrementing ilng else;

if the second co-ordinate index is less than the maximum second co-ordinate index increment the second co-ordinate index and else;

adjusting the antenna to have a tilt angle equal to the elevation angle.

10. A method, performed on an aircraft, for automatically adjusting the tilt angle of a radar antenna to limit ground clutter to acceptable levels, with the radar antenna scanning a forward field of view within a specified range, said method comprising the steps of:

storing a terrain database including terrain cells identified by latitude and longitude intersections indexed by ilat and ilng values, with each terrain cell storing including a terrain elevation value;

utilizing information in the terrain database to steer the radar antenna to avoid hilly terrain.

11. A device for automatically managing the tilt angle of an aircraft radar comprising:

a tilt angle controller having an input adapted to receive data indicative of a height above terrain; and said tilt angle controller further including a signal processing device coupled to said input and to said output for outputting a radar tilt control signal according to a predetermined schedule of tilt angles as a function of said height above terrain.

12. A device for automatically managing the tilt angle of an aircraft radar comprising:

a tilt angle controller having an input adapted to receive information from a terrain data base and an output; and said tilt angle controller further including a signal processing device coupled to said input and to said output for outputting a radar tilt control signal according to a predetermined logic defining tilt angle as a function of said information from said terrain data base.

13. The device of claim 12 wherein said tilt angle controller input is coupled to receive data from an EGPWS type terrain data base.

14. The device of claim 12 wherein said tilt angle controller includes a second input adapted to receive data indicative of an antenna parameter and wherein said predetermined logic accounts for said antenna parameter when defining tilt angle.

15. The device of claim 12 wherein said tilt angle controller further includes a second input adapted to receive data indicative of a position of the aircraft and wherein said predetermined logic defines said tilt angle as a function of the position of the aircraft relative to terrain.

16. A controller for automatically managing the tilt angle of an aircraft radar comprising:

an Enhanced Ground Proximity Warning System type device having an output adapted to assert signals useful for controlling a radar antenna and wherein said Enhanced Ground Proximity Warning System computes a radar tilt angle based upon a position of the aircraft relative to terrain.

17. The device of claim 11 wherein said tilt angle controller includes a second input adapted to receive signals indicative of a phase of aircraft flight and wherein said predetermined schedule further includes a schedule for defining tilt angles according to aircraft phase of flight.

18. A controller device for automatically managing the tilt angle of an aircraft radar comprising:

a tilt angle controller having an first input adapted to receive information from a terrain data base and a second input adapted to receive information indicative of an aircraft performance parameter, and an output; and said tilt angle controller further including a signal processing device coupled to said first and to said second inputs and to said output for outputting a plurality of radar tilt control signals, each one of said plurality of radar tilt control signals to command a tilt angle for a given sector of radar sweep and wherein said signal processing device outputs said plurality of radar tilt control signals according to a predetermined logic defining tilt angle as a function of said information from said terrain data base and said information indicative of an aircraft performance parameter.

19. An aircraft radar apparatus comprising:

a radar receiver/transmitter unit having an input;

a terrain based ground proximity warning system having an output coupled to said input of said radar receiver/transmitter unit and wherein said warning system outputs a radar tilt value to said receiver/transmitter unit; and said radar receiver/transmitter unite further including an output for outputting an automatic tilt control signal.

20. The radar apparatus of claim 19 further comprising:

a radar control panel coupled to said radar receiver/transmitter unit for toggling said radar receiver/transmitter between a first state wherein said automatic tilt control signal is enabled and a second state wherein said tilt control signal ins disabled.

21. The radar apparatus of claim 19 further comprising:

a radar control panel coupled to said terrain based ground proximity warning system for toggling said warning system between a first state wherein said system outputs said tilt angle and a second sate wherein said tilt angle is not output.

22. The radar apparatus of claim 19 further comprising:

a display, coupled to said receiver/transmitter unit.

23. The radar apparatus of claim 22 wherein said display is an EFIS type device.

* * * * *